United States Patent [19]
Ikeya et al.

[11] Patent Number: 5,572,500
[45] Date of Patent: Nov. 5, 1996

[54] OPTICAL FILTER WITH LIGHT TRANSMITTANCE DEPENDENCY ON INCIDENT ANGLE

[75] Inventors: Tomoyoshi Ikeya; Mitsuru Itamochi; Hidetoshi Yokosawa, all of Yamanashi-ken, Japan

[73] Assignees: Pioneer Electronic Corporation, Tokyo; Pioneer Video Corporation, Yamanashi-ken, both of Japan

[21] Appl. No.: 340,874

[22] Filed: Nov. 15, 1994

[30] Foreign Application Priority Data

Nov. 17, 1993 [JP] Japan ................................. 5-288411

[51] Int. Cl.⁶ ............................................. G11B 7/121
[52] U.S. Cl. ........................... 369/99; 369/112; 369/116; 369/118
[58] Field of Search .................... 369/99–112, 116, 369/118

[56] References Cited

U.S. PATENT DOCUMENTS

| | | | |
|---|---|---|---|
| 5,072,437 | 12/1991 | Chikuma | 369/118 |
| 5,121,239 | 6/1992 | Post | 359/95 |
| 5,121,378 | 6/1992 | Hirose et al. | 369/112 |
| 5,153,873 | 10/1992 | Spruit et al. | 369/118 |
| 5,247,510 | 9/1993 | Lee et al. | 369/118 |
| 5,434,840 | 7/1995 | Ezuka et al. | 369/116 |

FOREIGN PATENT DOCUMENTS

| | | |
|---|---|---|
| 5-224002 | 9/1993 | Japan . |
| 6-265721 | 9/1994 | Japan . |

*Primary Examiner*—Georgia Y. Epps
*Assistant Examiner*—Kim-Kwok Chu
*Attorney, Agent, or Firm*—Sughrue, Mion, Zinn, Macpeak & Seas

[57] ABSTRACT

An optical reproducing system has a first optical path from a light source to an optical disc, and a second optical path from the optical disc to a photodetector. An objective lens is provided in the first optical path for forming an a non-collimated beam applied to the optical disc. A profile conversion filter having an angle dependent transmittance characteristic is provided between the objective lens and the optical disc.

5 Claims, 3 Drawing Sheets

OPTICAL FILTER WITH LIGHT TRANSMITTANCE DEPENDENCY ON INCIDENT ANGLE

BACKGROUND OF THE INVENTION

The present invention relates to an optical recording and reproducing system.

FIG. 5a shows a conventional optical reproducing system having a block plate as a beam profile conversion plate. A laser beam 1a emitted from a laser 1 is paralleled at a collimator lens 2 and converged at a condenser lens 3. A block plate 4 is provided between the lenses 2 and 3 on an optical axis of the beam.

The laser beam 1a has luminous intensity as shown by a dotted line of FIG. 5b. When the laser beam 1a is blocked by the block plate, the luminous intensity thereof becomes as shown by a solid line of FIG. 5b at a point A. After the beam passes through the condenser lens 3, the luminous intensity becomes as shown by a solid line of FIG. 5c at a point B. Thus, a spot for a super-resolution is obtained.

FIG. 6a shows another conventional optical system. A beam profile conversion filter plate 6 having a pinhole 7 is provided after a condenser lens 5 for eliminating side lobes 1b appearing in the super-resolution spot of FIG. 5c. The laser beam has luminous intensity as shown in FIG. 6b. When the beam passes the pinhole 7 of the filter plate 6, side lobes are eliminated.

However, in these systems, it is necessary to dispose each of the plates 4 and 6 in the respective optical systems with positioning accuracy. In the former system, it is necessary to dispose the block plate 4 on the line of the optical axis of the beam. Otherwise, a desired super-resolution spot can not be obtained.

In the latter system, it is necessary to coincide the pinhole 7 of the filter plate 6 with a converging position of the condenser lens 5. Otherwise, elimination of side lobes becomes incomplete.

SUMMARY OF THE INVENTION

An object of the present invention is to provide a beam profile conversion filter where accurate positioning adjustment is not required.

According to the present invention, there is provided an optical reproducing system having a first optical path from a light source to an optical disc, and a second optical path from the optical disc to a photodetector, comprising an optical element provided in the first optical path for forming a non-collimated beam, and a light intensity profile conversion filter having an incident angle dependent transmittance characteristic provided in the unparalleled beam.

The angle dependent transmittance characteristic is such that the transmittance reduces with an increase of the incident angle.

The optical element may be an objective lens disposed above the optical disc, and the profile conversion filter is preferable disposed between the objective lens and the optical disc.

The other objects and features of this invention will become apparent from the following description with reference to the accompanying drawings.

DETAILED DESCRIPTION OF THE PREFERRED EMBODIMENTS

Figure 1:
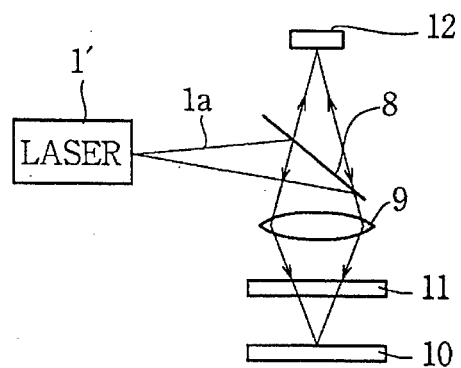
FIG. 1 is a schematic diagram showing an optical system to which the present invention is applied.

Referring to FIG. 1, an optical system for recording and reproducing information according to the present invention comprises a first optical path from a light source to an optical disc, which includes a laser 1', a beam splitter 8, an objective lens 9, and an optical disc 10, and a second optical path from the optical disc 10 to a photodetector 12. A beam profile conversion filter 11 is provided in the first optical path between the lens 9 and the disc 10. The beam profile conversion filter 11 is disposed in the unparalleled (non-collimated) laser beam.

Figure 2:
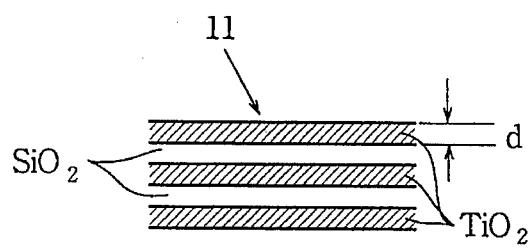
FIG. 2a is a sectional view showing a beam profile conversion filter.
FIG. 2b is a diagram showing a characteristic of the filter.
Figure 2:
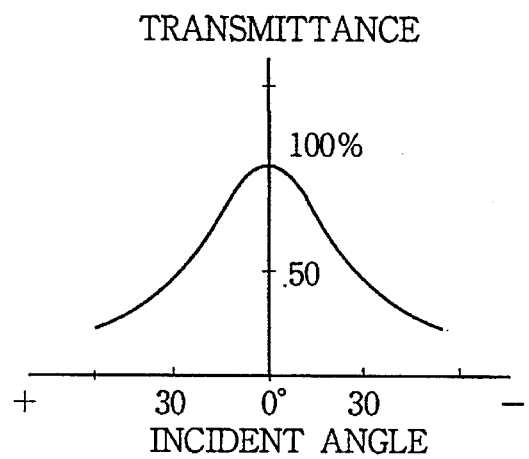

FIG. 2a shows the profile conversion filter 11 comprising multi-layered coated films. The films are made of $TiO_2$ and $SiO_2$ which are alternately layered with each other. Each film has a thickness d of ¼ wavelength of the laser beam. The filter 11 has a transmittance characteristic as shown in FIG. 2b. As the incident angle of the beam increases, the transmittance reduces, which is called an angle dependent transmittance characteristic.

Describing the operation of the system, the laser beam 1a from the laser 1' is reflected on the beam splitter 8 and converged at the objective lens 9. The converged beam passes through the filter 11 and focuses on the disc 10. The light reflected from the disc 10 is focused on the photodetector 12.

In the embodiment, a peripheral component of the laser beam is incidents on the filter at large incident angles as shown in FIG. 1. Consequently, side lobes deflected from the optical axis of the luminous intensity are suppressed. Furthermore, it is not necessary to adjust the positioning of the filter with accuracy.

Figure 3:
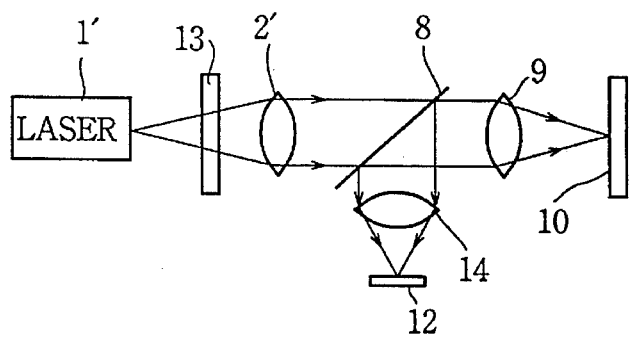
FIG. 3 is a diagram showing another embodiment of the present invention.
Figure 4:
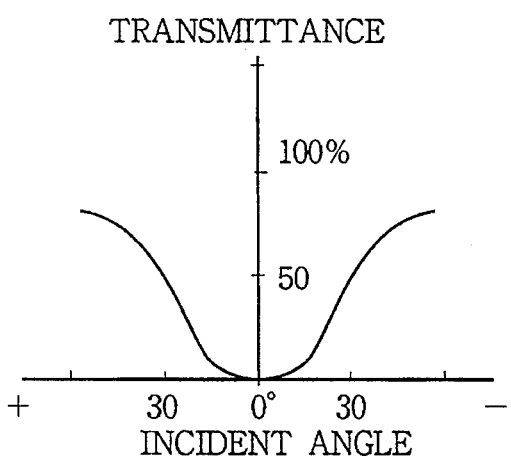
FIG. 4 is a diagram showing a characteristic of a filter of FIG. 3.

Referring to FIG. 3 showing another embodiment, a beam profile conversion filter 13 comprising multi-layered coated films is disposed between the laser 1' and a collimator lens 2'. The filter 13 has a transmittance characteristic as shown in FIG. 4.

The laser beam 1a emitted from the laser 1' is applied to the collimator lens 2' passing through the filter 13 and to the objective lens 9 to be focused on the disc 10. The light reflected from the disc 10 is reflected on the beam splitter 8 and focused on the photodetector 12 through a lens 14.

Figure 5:
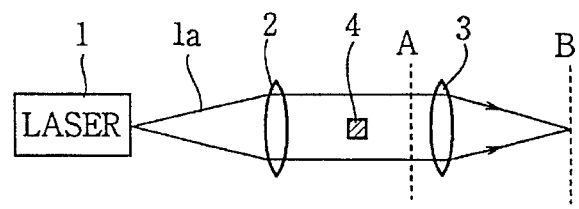
FIG. 5a is a diagram showing a conventional optical system.
FIGS. 5b and 5c are diagrams showing luminous intensity of a laser beam of the FIG. 5a system.
Figure 5:
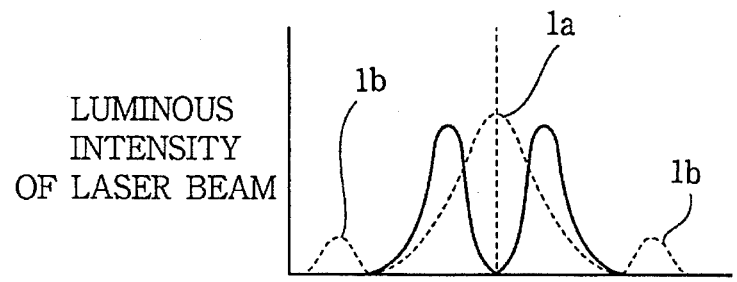
Figure 5:
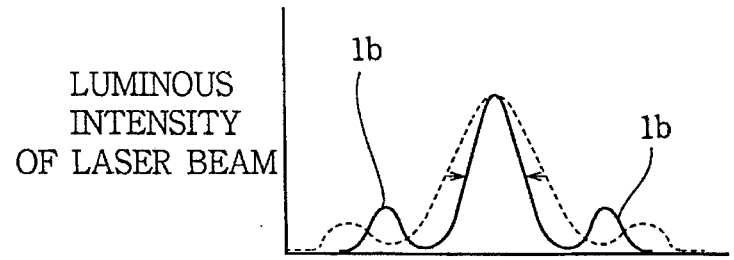
Figure 6:
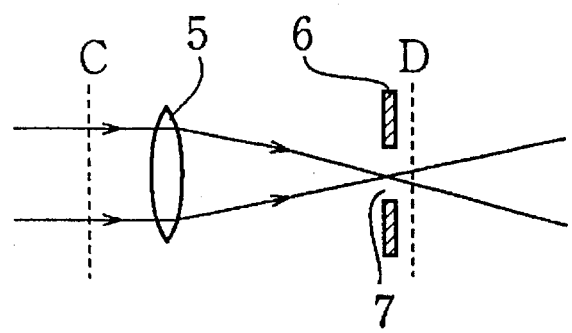
FIG. 6a is a diagram showing another conventional optical system.
FIG. 6b is a diagram showing luminous intensity of a laser beam of the FIG. 6a system.
Figure 6:
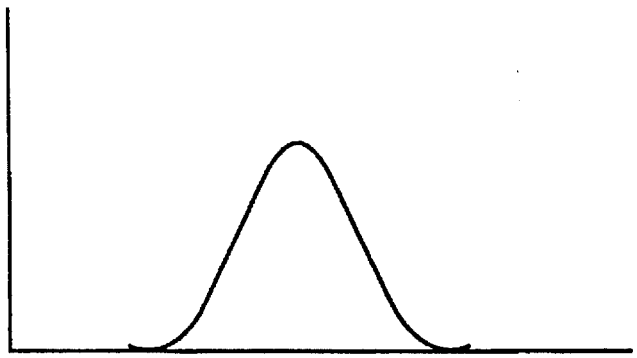

The beam passed through the filter 13 has luminous intensity as shown by the solid line of FIG. 5b. Thereafter, the beam is converged at the objective lens 9 so that the super-resolution spot shown by the solid line of FIG. 5c is obtained.

In the embodiment, the multi-layered films can be coated on an optical element in the optical system, such as a beam splitter to which a laser beam is applied as an a non-parallel beam.

From the foregoing, it will be understood that the beam profile conversion filter of the present invention comprises multi-layered coated films having an incident angle dependent transmittance characteristic. Consequently, it is not necessary to accurately adjust the position of the filter in the plane perpendicular to the optical axis of the beam.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An optical information reproducing system having a first optical path from a light source to an optical disc, and a second optical path from the optical disc to a photodetector, comprising:

an optical element provided in the first optical path for forming a non-collimated beam; and a light intensity profile conversion filter having an incident angle dependent transmittance characteristic provided in the non-collimate beam.

2. The system according to claim 1, wherein the angle dependent transmittance characteristic is such that the transmittance reduces with an increase of an incident angle.

3. The system according to claim 1, wherein the optical element is an objective lens disposed above the optical disc.

4. The system according to claim 3, wherein the light intensity profile conversion filter is disposed between the objective lens and the optical disc.

5. The system according to claim 1, wherein the light profile conversion filter comprises a plurality of films, each of said films being made either of $Ti_2O$ or of $SiO_2$, and said plurality of films being layered such that said $Ti_2O$ films alternate with said $SiO_2$ films.

* * * * *